Patented July 21, 1953

2,646,418

UNITED STATES PATENT OFFICE 2,646,418

PROCESS FOR POLYMERIZING MONOVINYL AROMATIC COMPOUNDS WITH RUBBER

John L. Lang, Midland, Mich., assignor to The Dow Chemical Company, Midland, Mich., a corporation of Delaware No Drawing. Application May 25, 1951,
Serial No. 228,355

7 Claims. (Cl. 260—45.5)

1

This invention relates to resinous compositions prepared from monovinyl aromatic compounds and an unsaturated rubber. It particularly concerns a method and agents for modifying the polymerization reaction and improving the molding characteristics of copolymers of monovinyl aromatic compounds and an unsaturated natural or synthetic rubber.

Polymeric compositions of styrene and rubber in chemically combined form and methods of making the same are well known. One such method consists in dissolving a small amount of natural rubber in monomeric styrene and polymerizing the latter by heating the solution in bulk, i. e. in the substantial absence of an inert liquid medium. It is known that such polymerization reactions are highly exothermic and that the mixtures are poor conductors of heat, so that control of the temperature to obtain a satisfactory rate of polymerization, or to obtain a polymeric product having a desired molecular weight, without spontaneous overheating of the polymerization mixture is difficult and becomes more difficult with increase in the quantity of material being polymerized. In preparing a resinous composition by the polymerization of a solution of a monovinyl aromatic compound, e. g. styrene, and a natural or synthetic rubber, the rubber which is dissolved or intimately dispersed in the monovinyl aromatic compound copolymerizes therewith and tends to form highly cross-linked, or branched chain, polymer molecules which are less soluble in the mixture than is the rubber. This tendency to form highly cross-linked polymers or gels results in the formation of polymeric products of non-uniform composition, and may cause separation of the polymerization mixture into two phases prior to the polymerization being completed. Although the heterogeneous polymeric products thus obtained may be mechanically worked, e. g. by milling on heated compounding rolls, to form a substantially uniform composition suitable for use in the manufacture of molded articles by usual injection or compression molding operations, such operations are time-consuming and costly. In most instances, the mechanical working which is required to blend the polymeric product into a homogeneous composition seriously impairs the mechanical properties of the product and renders it less suitable for extrusion or injection molding purposes than is desired, because of excessive molecular breakdown during the milling operation. Raising the temperature at which the polymerization is carried out so as

2 to obtain a product having a desired average molecular weight, or to suppress the tendency toward the formation of highly cross-linked polymers or gels, has not been satisfactory since overheating of the mass results in discoloring of the polymeric product and may cause an extremely vigorous, exothermic or "runaway" polymerization reaction.

It is an object of the invention to provide a method of polymerizing a solution of an unsaturated natural or synthetic rubber and a monovinyl aromatic compound which avoids the difficulties just mentioned. Another object is to provide a method and agents for regulating the polymerization of a solution composed principally of a monovinyl aromatic compound containing a minor amount of an unsaturated rubber so as to produce resinous compositions having improved molding characteristics. Still another object is to provide a method for regulating the molecular weight of the polymeric products obtained by the polymerization of a solution of an unsaturated rubber and one or more monovinyl aromatic compounds. A further object is to provide a method and agents for controlling the polymerization of a solution of a monovinyl aromatic compound and a minor amount of a natural or synthetic rubber so as to avoid the occurrence of an extremely vigorous exothermic polymerization reaction. Still another object is to provide a method of polymerizing a solution of a monovinyl aromatic compound and a natural or synthetic rubber, wherein the monovinyl aromatic component is present in major amount by procedure which avoids the formation of highly cross-linked polymers or gels. Other and related objects will become apparent from the following description of the invention.

According to the invention the foregoing and related objects are obtained by polymerizing a solution of one or more monovinyl aromatic compounds having the vinyl radical directly attached to a carbon atom of the aromatic nucleus, e. g. styrene or ar-methylstyrene, and a natural or synthetic rubber in the presence of an unsaturated dimer of a monomeric alpha-alkyl styrene having the general formula:

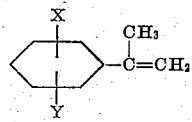

wherein each of the symbols X and Y represents the same or different members of the group consisting of hydrogen, halogens and lower alkyl radicals containing not more than three carbon atoms.

The unsaturated dimers of alpha-alkyl styrenes have an unusual effect as modifying agents or regulators for the polymerization of a monovinyl aromatic compound with an unsaturated natural or synthetic rubber in mass, i. e. in the substantial absence of inert liquid media, to produce a polymeric product having a substantially lower molecular weight than is obtained when the copolymerization is carried out in the absence of the unsaturated dimers under otherwise similar polymerization conditions. The effect of the unsaturated dimer in causing a lowering of the molecular weight of the copolymer appears to result in the formation of a polymeric product composed for the most part of polymer chains having a relatively narrow range of molecular weights. The unsaturated dimers also have an effect of restricting greatly, or entirely suppressing, the tendency toward the formation of cross-linked or highly branched-chain polymers, and substantially reduces the tendency toward the occurrence of a vigorous exothermic or runaway polymerization reaction.

The invention permits the production of copolymers of a monovinyl aromatic compound, e. g. styrene, and an unsaturated natural or synthetic rubber, which polymeric product is of substantially uniform composition. Such polymeric product is suitable for use for extrusion or injection molding purposes without further processing, or may readily be compounded with pigments, dyes, or plasticizing agents, with a minimum amount of mechanical working.

The polymerization regulators or modifying agents with which the invention is concerned are the unsaturated dimers of monomeric alpha-alkyl styrenes having the general formula:

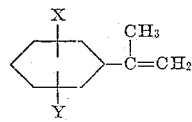

wherein X and Y each represent the same or different members of the group consisting of hydrogen, halogens, and lower alkyl radicals containing not more than three carbon atoms. The unsaturated dimers of such monomeric alpha-alkyl styrenes may be prepared by procedure described in United States Patent No. 2,429,719. Examples of suitable monomeric alpha-alkyl styrenes from which the unsaturated dimers may be prepared are alpha-methyl styrene, para-methyl-alpha-methyl styrene, para-ethyl-alpha-methyl styrene, para - isopropyl - alpha - methyl styrene, meta-ethyl-alpha-methyl styrene, meta-methyl-alpha-methyl styrene, ar-dimethyl-alpha-methyl styrene, ar-chloro - alpha - methyl styrene, 3,4-dichloro-alpha-methyl styrene, ar-chloro-ar-methyl-alpha-methyl styrene, ar-diethyl-alpha-methyl styrene, and ar-methyl - ar - isopropyl-alpha-methyl styrene.

It may be mentioned that the unsaturated olefinic product obtained by the reaction for the dimerization, i. e. the reaction of two molecules of an alpha-alkyl styrene having the aforementioned formula with each other, is usually a mixture composed principally of the corresponding isomeric unsaturated dimers, which compounds are difficult to separate from each other in usual ways, e. g. by distillation. For instance, the unsaturated product obtained by the dimerization of alpha-methyl styrene usually consists of a mixture of the compounds 2,4-diphenyl-4-methyl-2-pentene and 2,4-diphenyl-4-methyl-1-pentene. The latter compound has an effect of causing a more pronounced lowering of the molecular weight of the polymer formed, e. g. by the copolymerization of a solution of monomeric styrene and a synthetic rubber, than has a like amount of the isomeric compound 2,4-diphenyl-4-methyl-2-pentene under otherwise similar polymerization conditions. However, both of the isomeric unsaturated dimers of alpha-methyl styrene are effective polymerization modifying agents for regulating the molecular weight of the polymeric product, and suppressing the tendency toward the formation of highly cross-linked polymers in the copolymerization of a monovinyl aromatic compound with a natural or synthetic rubber so that mixtures of the isomeric unsaturated dimers may satisfactorily be used. The unsaturated dimers of a monomeric alpha-alkyl styrene containing only halogen atoms, or lower alkyl radicals, as nuclear substituents are usually employed as a mixture of the corresponding isomeric derivatives of 1-pentene and 2-pentene, although the isomeric unsaturated dimers may be separated from each other and used in pure, or substantially pure, form. The unsaturated dimers are used in amount corresponding to from 0.005 to 0.75, preferably from 0.1 to 0.5 per cent by weight, based on the weight of the copolymerizable starting materials. Further increases in the proportion of the unsaturated dimers, e. g. 2 per cent by weight, causes a further lowering of the molecular weight of the polymer being formed, but also results in undesirable lowering of the properties, tensile strength and heat distortion temperature for the polymer.

Styrene is the preferred monovinyl aromatic compound employed in making the copolymers, but other monovinyl aromatic compounds having the vinyl radical directly attached to a carbon atom of the aromatic nucleus such as para-methyl styrene, meta-methyl styrene, para-ethyl-styrene, para - isopropylstyrene, ortho-chloro-styrene, para-chlorostyrene, ar-dimethylstyrene, ar - dichlorostyrene, ar-methyl-ar-ethylstyrene, ar-methyl-ar-chlorostyrene, ar - diethylstyrene, para-fluorostyrene, para-bromostyrene, or ar-methyl-ar-isopropylstyrene, or mixtures of any of these compounds with styrene or with each other may be used. Mixtures of any of the above-named monovinyl aromatic compounds with a monoalkenyl aromatic compound copolymerizable therewith such as alpha-methyl styrene, para-methyl-alpha-methyl styrene, ar-dimethyl-alpha-methyl styrene, 3,4-dichloro-alpha-methyl styrene or para-isopropyl-alpha-methyl styrene, in which mixture of monomeric polymerizable aromatic compounds the monovinyl aromatic compound component is present in amount corresponding to at least 75 per cent by weight, based on the total weight of the monomeric polymerizable aromatic compounds, may also be used.

Any unsaturated and unvulcanized natural or synthetic rubber which is soluble in monomeric styrene, or which can be rendered soluble in monomeric styrene, e. g. by milling on compounding rolls, may be used in the process. The unsaturated rubber starting material is preferably a natural rubber, or a synthetic GR–S type rubber, i. e. a rubbery copolymer of styrene and butadiene, which rubber can readily be dissolved in monomeric styrene to form solutions containing from 2 to 20 per cent by weight or more of the rubber. Examples of suitable rubber or rubbery copolymers are natural crepe rubber, synthetic GR–S type rubber containing in chemically combined form from 40 to 80 per cent by weight of butadiene and from 60 to 20 per cent of styrene, synthetic GR–N type rubber containing in chemically combined form from 65 to 82 per cent by weight of butadiene and from 35 to 18 per cent of acrylonitrile, and rubbery homopolymers of butadiene-1,3.

The rubber should have a degree of unsaturation corresponding to at least 50 per cent of that of natural rubber, which for practical purposes is assumed to contain one olefinic carbon to carbon linkage for each isoprene group ($C_5H_8$) in the natural rubber molecule and has a degree of unsaturation of 100 per cent. In the case of a synthetic rubber of the type mentioned, the unsaturation corresponds to one olefinic linkage for each butadiene group in the synthetic rubber. Thus, in a synthetic GR–S type rubber which is a copolymer containing in chemically combined form 65 per cent by weight of styrene and 35 per cent of butadiene, the degree of unsaturation of the synthetic rubber corresponds to approximately 51 per cent of that of natural rubber. Correspondingly, a GR–S type rubber which is a copolymer of 50 per cent by weight of styrene and 50 per cent of butadiene has a degree of unsaturation corresponding to about 70 per cent of that of natural rubber. The unsaturated rubber should have a molecular weight of at least 15,000 and may be used in amount corresponding to from one per cent up to the limit of solubility of the rubber in the monomeric polymerizable aromatic compound. The unsaturated rubber is usually employed in amount corresponding to from two to fifteen per cent, preferably from four to ten per cent, by weight, based on the weight of the copolymerizable starting materials.

The polymerization reaction is carried out in bulk, i. e. in the substantial absence of inert liquid media, and at temperatures between 65° and 150° C., preferably at temperatures of from 80° to 120° C. The polymerization may be carried out at atmospheric, or superatmospheric pressure. The polymerization is suitably carried out under a pressure sufficient to prevent loss of monomers by vaporization from the polymerizing mixture at the temperature employed.

Polymerization catalysts such as benzoyl peroxide, tertiary-butyl-hydroperoxide, or di-tertiary-butyl peroxide, may advantageously be employed in the reaction, but the use of such catalyst is not required. Small amounts of organic compounds such as soybean oil, butyl stearate, or refined mineral oil (white mineral oil) may advantageously be incorporated with the starting materials as lubricants for the polymeric product during subsequent molding or extruding operations.

In practice, the polymerizable monoethylenically unsaturated aromatic compound, e. g. styrene, and a natural or synthetic rubber are mixed together in the desired proportions. The mixture is stirred and maintained at room temperature or thereabout to dissolve the rubber in the monomeric polymerizable aromatic compound. The resulting solution is usually filtered to remove insoluble gel particles of the rubber, together with any foreign substances, so as to obtain a homogeneous dispersion or solution of the rubber and the polymerizable aromatic compound. The solution, together with the desired amount of an unsaturated dimer of an alpha-alkyl styrene, e. g. an unsaturated dimer of alpha-methyl styrene, suitably in amount corresponding to from 0.005 to 0.75 per cent by weight of the solution, is placed in a closed vessel and the mixture is polymerized by heating the same to a temperature between 65° and 150° C., preferably to temperatures between 80° and 120° C. The solution may be polymerized by heating the same at such temperatures until the polymerization is about 90 per cent complete. Thereafter, the mixture may advantageously be heated to a higher temperature, e. g. to temperatures of from 160° to 220° C., to polymerize the remaining monomers. The copolymer product is frequently obtained in a form suitable for direct employment for the intended purpose, but when necessary it is treated in any usual way to obtain the same in the desired form. For instance, volatile ingredients are usually vaporized from the polymeric product by heating in vacuum and the product is thereafter cooled and cut or ground to a suitable form.

The process may be carried out batchwise, or in continuous manner. For instance, a solution of a polymerizable monovinyl aromatic compound, e. g. styrene, and a natural or synthetic rubber may be heated to polymerization temperatures within the range previously mentioned while passing the same through a heated coil until a reaction product containing from 40 to 70 per cent by weight of polymer is obtained and thereafter separating the volatile ingredients from the polymeric product. Unreacted monomers thus obtained may be reused in the process, suitably after being purified in any usual way, e. g. by distillation.

Alternatively, a solution of one or more monovinyl aromatic compounds and an unsaturated natural or synthetic rubber containing the copolymerizable ingredients in the desired proportions may be passed through a series of heated zones wherein the temperature of the mass is progressively increased to polymerize the same and maintain the mass in a heat-plastified flowable state until all or nearly all of the monomeric starting materials are polymerized and thereafter discharging the polymeric product and cooling and cutting the same into a granular form suitable for molding.

The following examples illustrate ways in which the principle of the invention has been applied, but are not to be construed as limiting the invention.

*Example 1*

In each of two comparative experiments a solution of 15 grams of GR–S–X274 synthetic rubber (a copolymer of approximately 23.5 per cent by weight of styrene and 76.5 per cent of butadiene, having a Mooney viscosity between 60 and 70), 279 grams of styrene, 3 grams of soybean oil and 3 grams of nor.-butyl stearate was treated with 0.03 per cent by weight of benzoyl peroxide. In experiment (A), the solution was sealed in a closed container and polymerized to a resinous mass by heating the same in a water bath maintained at a temperature of 90° C. for a time of 10 days. Thereafter, the mass was heated in the closed container at a temperature of 150° C. for a period of 3 days, then cooled. In experiment (B) the solution was mixed with 0.5 per cent by weight of a liquid fraction containing unsaturated dimers of alpha-methyl styrene and boiling at a temperature of 156° C. at 4 millimeters absolute pressure. The liquid had a specific gravity of 0.986 at 25° C. compared to that of water at the same temperature, and was a mixture of about 35 per cent by weight of 2,4-diphenyl-4-methyl-1-pentene, 56 per cent 2,4-diphenyl-4-methyl-2-pentene and 9 per cent of 1,1,3-trimethyl-3-phenyl indan. The resultant solution was polymerized to a resinous mass by heating the same in a closed container immersed in a water bath maintained at a temperature of 90° C. for a time of 15 days. Thereafter, the mass was heated in the closed container at a temperature of 150° C. for a time of 3 days, then cooled. The product from each of the experiments was removed from the container and crushed to a granular form. The polymeric product was milled for a period of 10 minutes on a pair of compounding rolls each of 3 inches diameter and 8 inches length. One of the rolls was internally heated to a temperature of 345° F. with steam, and the other was heated in similar manner to a temperature of 240° F. The milled product was removed from the rolls, allowed to cool and cut to a granular form. The rate of flow at 135° C. in terms of seconds for a sample of the material to flow one and one-half inches through a ⅛ inch orifice under an applied pressure of 1000 pounds per square inch was determined in accordance with procedure described in A. S. T. M. D569-44T. The time required for this amount of flow becomes less with increase in rate of flow, and the rate of flow increases with lowering of the molecular weight of the polymeric product. Other portions of the product were used to determine the per cent volatiles and a viscosity characteristic of the polymer. The procedure in determining the proportion of volatile material was to weigh a portion of the polymeric product, then heat it under vacuum at 213° C. and at 1 millimeter absolute pressure for 25 minutes and cool and re-weigh. The loss in weight represents volatile material. The viscosity characteristic was determined by dissolving a portion of the polymeric product in toluene to form a solution containing 10 per cent by weight of the product and determining the absolute viscosity in centipoises at 25° C. of the solution. The polymeric products had the properties:

|  | A | B |
|---|---|---|
| Unsaturated dimers of alpha-methyl styrene, percent | none | 0.5 |
| Volatiles, percent | 1.6 | 1.7 |
| Flow rate, seconds | 224 | 105 |
| Viscosity, centipoises | 141 | 24 |

*Example 2*

A solution of 558 grams of monomeric styrene and 30 grams of synthetic GR-S-X274 rubber was mixed with 6 grams of nor.-butyl stearate, 6 grams of soybean oil, 0.18 gram of benzoyl peroxide and 3 grams of the liquid fraction containing unsaturated dimers of alpha-methyl styrene described in Example 1. The resultant solution was polymerized to a resinous mass by heating the same in a closed container, immersed in a water bath maintained at a temperature of 90° C., for a period of 21 days. Thereafter, the mass was heated in the closed container at a temperature of 150° C. for a period of 3 days longer, then cooled. The solid polymeric product was removed from the container and was crushed to a granular form. The rate of flow at 135° C. for the product was determined as described in Example 1. The remainder of the polymeric material was mechanically worked for a period of 10 minutes on a pair of compounding rolls each of 3 inches diameter and 8 inches length. One of the rolls was internally heated with steam at a temperature of 340° F. and the other was heated in similar manner to a temperature of 200° F. The product was removed from the rolls, was allowed to cool and was crushed to a granular form suitable for molding into test pieces. A portion of the product was injection molded to form test bars of ⅛ by ½ inch rectangular cross section by 2½ inches long. These test pieces were used to determine the tensile strength in pounds per square inch of original cross section, the per cent of its original length by which the product could be elongated under tension before breakage occurred, and the impact strength in foot pounds of energy per inch of notch to break a test bar. The procedures in measuring tensile strength and per cent elongation were similar to those described in A. S. T. M. D638-44T. Impact strength measurements were determined by procedure similar to that described in A. S. T. M. D256-47T with notched test bars of the dimensions just given, the notches of the notched bars being of 0.015 inch depth transversely across the narrower side of the bar along a line midway between the ends of the bar.

For purpose of comparison a similar amount of the solution of monomeric styrene and the synthetic GR-S-X274 rubber, together with the nor.-butyl stearate, the soybean oil and the benzoyl peroxide catalyst in the same proportions, was polymerized in the absence of the unsaturated dimers of alpha-methyl styrene. The solution was polymerized to a resinous mass by heating the same in a closed container, immersed in a water bath maintained at a temperature of 90° C., for a period of 5 days. Thereafter, the mass was heated in the closed container at a temperature of 150° C. for a period of 3 days longer, then cooled. The product was removed from the container and was crushed to a granular form. The rate of flow for the product was determined as described in Example 1. The remainder of the product was milled on the compounding rolls for a period of 10 minutes; one of the rolls was internally heated with steam to a temperature of 380° F. and the other was heated to a temperature of 280° F. The product was removed from the rolls, allowed to cool and crushed to a granular form suitable for molding into test pieces. The properties for the polymer were determined as just described. The properties determined for the polymeric products obtained by polymerizing the styrene-rubber solution in the presence and in the absence of the unsaturated dimers of alpha-methyl styrene were as follows:

|  | A | B |
|---|---|---|
| Unsaturated dimers of alpha-methyl styrene, percent | none | 0.5 |
| Tensile Strength, lbs./sq. in. | 5,900 | 5,460 |
| Notched Impact Strength, Ft.-lbs | 2.9 | 3.7 |
| Elongation, Percent | 20.6 | 22.3 |
| Flow Rate, Seconds | 326 | 135 |

*Example 3*

In each of a series of experiments, a solution of 5 parts by weight of GR-S-26 rubber (a copolymer of approximately 23.5 per cent by weight of styrene and 76.5 per cent of butadiene, having a Mooney viscosity between 45-55), 93 parts of styrene, 1 part of soyabean oil and 1 part of nor.-butyl stearate was treated with 0.03 per cent by weight of benzoyl peroxide. A charge of 300 grams of the solution, together with unsaturated dimers of alpha-methyl styrene in amount as stated in the following table was polymerized by heating the same in a closed container immersed in a water bath maintained at a temperature of 90° C., until a solid resinous mass was obtained. Thereafter, the mass was heated in the closed container at a temperature of 150° C. for a time of 3 days, then cooled. The unsaturated dimers of alpha-methyl styrene used in the experiments was a liquid boiling at a temperature of 122° C. at 1.5 millimeters absolute pressure, and had a specific gravity of 0.985 at 25° C. compared to that of water at the same temperature, and an index of refraction $n_D^{25}=1.5655$. It was a liquid mixture of about 77 per cent by weight of 2,4-diphenyl-4-methyl-1-pentene, 5 per cent of 2,4-diphenyl-2-methyl-2-pentene and 18 per cent of 1,1,3-trimethyl-3-phenyl indan. The polymeric product from each of the experiments was removed from the container and crushed to a granular form suitable for molding into test pieces. The rate of flow at 135° C. in terms of seconds for a sample of the material to flow one and one-half inches through a 1/8 inch orifice under an applied extrusion pressure of 1000 pounds per square inch was determined as described in Example 1. Portions of each product were injection molded to form test bars having the dimensions 2 1/8 inches long by 1/8 by 1/2 inch rectangular cross section. These test bars were used for determining the tensile strength in pounds per square inch for each product. Other molded test pieces were used to determine the heat distortion temperatures by a procedure of Heirholzer and Boyer A. S. T. M. Bulletin No. 134 of May 1945. Table I gives the parts by weight of the styrene solution and the per cent by weight of the liquid fraction containing the unsaturated dimers of alpha-methyl styrene used in preparing each product. The table also gives the properties determined for each product. For purpose of comparison polymeric products which are outside the scope of the invention are included in the table.

TABLE I

| Run No. | Starting Solution | | Properties of Products | | |
|---|---|---|---|---|---|
| | Styrene Solution, Parts | Percent Unsaturated Dimers of Alpha-Methyl Styrene | Flow Rate, Seconds | Tensile Strength, lbs./sq. in. | Heat Distortion Temp., °C. |
| 1 | 100 | 0 | 350 | 6,160 | 86 |
| 2 | 100 | 0.1 | 290 | 5,790 | 76 |
| 3 | 100 | 0.3 | 241 | 5,630 | 78 |
| 4 | 100 | 0.4 | 137 | 5,520 | 79 |
| 5 | 100 | 0.5 | 115 | 5,310 | 82 |
| 6 | 100 | 0.75 | 89 | 4,600 | 74 |
| 7 | 100 | 2.0 | 48 | 1,490 | 67 |

*Example 4*

In each of a series of comparative experiments, a solution of 5 parts by weight of GR-S-X274 synthetic rubber (a copolymer of approximately 23.5 per cent by weight of styrene and 76.5 per cent of butadiene), 93 parts of styrene, 1 part of nor.-butyl stearate and 1 part of soybean oil, was mixed with 0.03 per cent by weight of benzoyl peroxide. In each experiment, 90 pounds of the solution, together with unsaturated dimers of alpha-methyl styrene in amount as stated in the following table was polymerized by heating the same in a closed container immersed in a water bath. The successive temperatures at which the bath was maintained were 75° C. for 24 hours; 67° C. for 139 hours; 70° C. for 47 hours, and 75° C. until the starting materials were substantially polymerized. Thereafter, the resinous mass was heated in the closed container at a temperature of 150° C. for 3 days, then cooled. The temperature inside the polymerization mixture was determined with an encased thermometer which projected into the mixture. The unsaturated dimers of alpha-methyl styrene used in the experiments was a liquid boiling at a temperature of 156° C. at 4 millimeters absolute pressure, and had a specific gravity of 0.986 at 25° C. compared to water at the same temperature. The liquid was a mixture of about 35 per cent by weight of 2,4-diphenyl-4-methyl-1-pentene, 56 per cent of 2,4-diphenyl-4-methyl-2-pentene and 9 per cent of 1,1,3-trimethyl-3-phenyl indan. The polymeric product was removed from the container and crushed to a granular form suitable for molding. Portions of each product were injection molded to form test pieces 2 1/8 inches long of 1/8 by 1/2 inch rectangular cross section. These test pieces were used for determining the properties, tensile strength, impact strength, and per cent elongation values in accordance with procedure similar to A. S. T. M. standard test methods. Impact strength measurements were made on notched test bars of the dimensions just given, the notches of the notched bars being of 0.015 inch depth transversely across a side-face of the bar along a line midway between the ends of the bar. Other portions of each product were extruded in the form of a strip having the approximate dimensions 5 inches wide by 0.020 inch thick. The extruded strip was examined for gel particles and uniformity of product. Table II gives the per cent by weight of the liquid fraction of unsaturated dimers in the mixture of polymerizable materials used to prepare each product. The table gives the maximum, or peak, temperature to which the mixture spontaneously heated, due to the heat of reaction, and the time in hours after the start of the polymerization when the peak temperature was reached. It also gives, for each product, the tensile strength in pounds per square inch, the impact strength in foot-pounds per inch of notch for notched test bars, and the per cent of its original length by which a test bar could be elongated under tension before breakage occurred. The table also gives the appearance of the extruded product.

TABLE II

| Run No. | Starting Materials | | Peak Temp. | | Properties of Products | | | |
|---|---|---|---|---|---|---|---|---|
| | GR-S-X274 Rubber-Styrene Solution, Parts | Percent Unsaturated Dimers of Alpha-Methyl Styrene | °C. | Hrs. When Reached | Tensile Strength, lbs./sq. in. | Notched Impact Strength, Ft.-lbs. | Percent Elongation | Appearance of Extruded Strip |
| 1 | 100 | None | 220 | 100 | 5,230 | 0.124 | 22.7 | Many gel particles. |
| 2 | 100 | 0.125 | 92 | 232 | 5,500 | 0.152 | 22.1 | Few gel particles. |
| 3 | 100 | 0.25 | 124 | 246 | 5,320 | 0.195 | 17.6 | No gel particles. |

Example 5

A mixture of 93 parts by weight of styrene, 5 parts of unvulcanized natural rubber, 1 part of nor.-butyl stearate and 1 part of soybean oil, together with 0.03 per cent by weight of benzoyl peroxide, was stirred at room temperature over a period of about 16 hours to dissolve the rubber. A charge of 300 grams of the solution, together with 0.75 gram of a liquid fraction consisting principally of unsaturated dimers of alpha-methyl styrene, was polymerized to a resinous mass by heating the same in a closed container at a temperature of 90° C. over a period of 4 days. The resinous product was heated in the closed container at a temperature of 200° C. for a period of 3 days longer, then cooled. The unsaturated dimers used in the experiment was a liquid fraction boiling at 156° C. at 4 millimeters absolute pressure and had a specific gravity of 0.986 at 25° C. compared to water at the same temperature. It was a mixture of 35 per cent by weight of 2,4-diphenyl-4-methyl-1-pentene, 56 per cent of 2,4-diphenyl-4-methyl-2-pentene and 9 per cent of 1,1,3-trimethyl-3-phenyl indan. The polymeric product was removed from the container and crushed to a granular form. The mechanical properties of the polymeric product were determined by procedure described in Example 1. For purpose of comparison a similar charge of the solution was polymerized under the same time and temperature conditions, except in the absence of the unsaturated dimers of alpha-methyl styrene. The properties determined for the polymeric products obtained by polymerizing the solution of styrene and natural rubber in the presence and in the absence of the unsaturated dimers of alpha-methyl styrene as a polymerization modifying agent were as follows:

|  | A | B |
|---|---|---|
| Unsaturated Dimers of Alpha-Methyl Styrene, percent | None | 0.25 |
| Tensile Strength, lbs./sq. in | 7,820 | 7,400 |
| Notched Impact Strength, Foot-lbs | 1.11 | 0.75 |
| Elongation, Percent | 2.5 | 3.2 |
| Viscosity (10% in toluene), centipoises | 45 | 23.5 |

Other modes of applying the principle of the invention may be employed instead of those explained, change being made as regards the steps or ingredients herein employed, provided the steps or ingredients stated in any of the following claims or the equivalent of such steps or ingredients be employed.

I claim:

1. The method of making a resinous composition which comprises, polymerizing a solution of from 85 to 98 per cent by weight of an organic liquid composed of at least one monomeric polymerizable monoalkenyl aromatic compound of the benzene series having an alkenyl radical selected from the group consisting of the vinyl and isopropenyl radicals as the sole polymerizable group directly attached to a carbon atom of the aromatic nucleus, wherein the aromatic polymerizable portion of said liquid consists of at least 75 per cent by weight of a monovinyl aromatic compound selected from the group consisting of the monovinyl aromatic hydrocarbons of the benzene series and nuclear halogenated derivatives thereof, and from 15 to 2 per cent of an unsaturated rubber selected from the group consisting of natural rubber, rubbery copolymers of from 20 to 60 per cent by weight of styrene and from 80 to 40 per cent of butadiene, rubbery copolymers of from 18 to 35 per cent by weight of acrylonitrile and from 82 to 65 per cent of butadiene, and homopolymers of butadiene, in the presence of from 0.005 to 0.75 per cent by weight, based on the weight of the solution, of a polymerization modifying agent which is an unsaturated dimer of a monomeric alpha-alkyl styrene having the general formula:

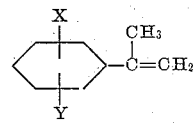

wherein X and Y each represents a member of the group consisting of hydrogen, halogens, and lower alkyl radicals containing not more than three carbon atoms by heating the solution together with said agent at a polymerization temperature between 65° and 150° C.

2. The method of making a resinous composition which comprises, polymerizing a solution of from 85 to 98 per cent by weight of a monomeric polymerizable monovinyl aromatic compound selected from the group consisting of the monovinyl aromatic hydrocarbons of the benzene series and nuclear halogenated derivatives thereof and from 15 to 2 per cent of an unsaturated rubber selected from the group consisting of natural rubber, rubbery copolymers of from 20 to 60 per cent by weight of styrene and from 80 to 40 per cent of butadiene, rubbery copolymers of from 18 to 35 per cent by weight of acrylonitrile and from 82 to 65 per cent of butadiene, and homopolymers of butadiene, in the presence of from 0.005 to 0.75 per cent by weight, based on the weight of the solution, of a polymerization modifying agent which is an unsaturated dimer of a monomeric alpha-alkyl styrene having the general formula:

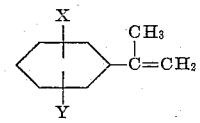

wherein X and Y each represents a member of the group consisting of hydrogen, halogen, and lower alkyl radicals containing not more than three carbon atoms by heating the solution together with said agent at a polymerization temperature between 65° and 150° C.

3. The method of making a resinous composition which comprises polymerizing a solution of from 85 to 98 per cent by weight of styrene and from 2 to 15 per cent of a rubbery copolymer of from 20 to 60 per cent by weight of styrene and from 80 to 40 per cent of butadiene, in the presence of from 0.005 to 0.75 per cent by weight, based on the weight of the solution, of a polymerization modifying agent which is an unsaturated dimer of a monomeric alpha-alkyl styrene having the general formula:

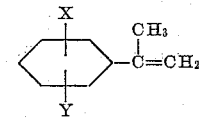

wherein X and Y each represents a member of the group consisting of hydrogen, halogens, and lower alkyl radicals containing not more than three carbon atoms.

4. A process as claimed in claim 2 wherein the polymerization modifying agent is an unsaturated dimer of alpha-methyl styrene.

5. A process as claimed in claim 2 wherein the polymerization modifying agent is an unsaturated dimer of para-methyl-alpha-methyl styrene.

6. A process as claimed in claim 2 wherein the polymerization modifying agent is an unsaturated dimer of ar-dimethyl-alpha-methyl styrene.

7. The method of making a resinous composition which comprises, polymerizing a solution of from 85 to 98 per cent by weight of styrene and from 15 to 2 per cent of an unsaturated rubber selected from the group consisting of natural rubber, rubbery copolymers of from 20 to 60 per cent by weight of styrene and from 80 to 40 per cent of butadiene, rubbery copolymers of from 18 to 35 per cent by weight of acrylonitrile and from 82 to 65 per cent of butadiene, and homopolymers of butadiene, in the presence of from 0.005 to 0.75 per cent by weight, based on the weight of the solution, of a polymerization modifying agent which is an unsaturated dimer of a monomeric alpha-alkyl styrene having the general formula:

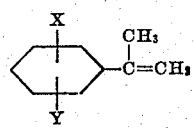

wherein X and Y each represents a member of the group consisting of hydrogen, halogens and lower alkyl radicals containing not more than three carbon atoms, by heating the solution together with said agent at a polymerization temperature between 65° and 150° C.

JOHN L. LANG.

References Cited in the file of this patent

FOREIGN PATENTS

| Number | Country | Date |
|---|---|---|
| 530,375 | Great Britain | Dec. 11, 1940 |